(12) United States Patent
Kumar et al.

(10) Patent No.: US 12,016,080 B2
(45) Date of Patent: *Jun. 18, 2024

(54) SYSTEM AND METHOD TO MODIFY RADIO ACCESS NETWORK (RAN) FEATURES

(71) Applicant: JIO PLATFORMS LIMITED, Ahmedabad (IN)

(72) Inventors: Ranjit Ma Kumar, Jabalpur (IN); Amol M Kadam, Thane (IN); Ulhas D Parab, Mumbai (IN); Nikhil V Ghadge, Mumbai (IN); Bhushan Palande, Kalyan (IN); Humera Shaikh, Thane (IN); Rakesh Khati, Thane (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,407

(22) Filed: Jul. 5, 2023

(65) Prior Publication Data

US 2024/0121596 A1   Apr. 11, 2024

Related U.S. Application Data

(63) Continuation of application No. 16/945,583, filed on Jul. 31, 2020, now Pat. No. 11,716,608.

(30) Foreign Application Priority Data

Jul. 31, 2019   (IN) .............................. 201921030967

(51) Int. Cl.
*H04W 8/22*   (2009.01)
*H04W 72/51*   (2023.01)

(52) U.S. Cl.
CPC .............. *H04W 8/22* (2013.01); *H04W 72/51* (2023.01)

(58) Field of Classification Search
None
See application file for complete search history.

(56) References Cited

U.S. PATENT DOCUMENTS 6,041,228 A * 3/2000 Niska .................... H04W 24/02
455/419
2012/0002614 A1   1/2012 Ekici et al.
(Continued)

FOREIGN PATENT DOCUMENTS

WO   WO 2018/174995   9/2018

*Primary Examiner* — Jinsong Hu
*Assistant Examiner* — Alexander J Yi
(74) *Attorney, Agent, or Firm* — Klarquist Sparkman, LLP

(57) ABSTRACT

A system and method to reduce misuse of radio resources, by modifying radio access network (RAN) features of user devices. The UE segregation server unit [302] as disclosed in the present disclosure identifies one or more UE required to be modified due to which network KPI's are getting degraded, based on an analysis performed by a Network Performance Unit [304]. Further, the UE segregation server unit [302] updates/modifies a UE Capability Indication message to disable certain radio capabilities causing some malfunction in the network based on identification of one or more UEs as erroneous UE based on a successful comparison of the at least one TAC information present in the UE Capability Indication message with at least one TAC information of the identified one or more UE that are required to be modified. This disclosure provides improved throughput for network subscriptions in user devices by saving network resources.

15 Claims, 8 Drawing Sheets

(56) References Cited

U.S. PATENT DOCUMENTS

| | | |
|---|---|---|
| 2018/0270126 A1 | 9/2018 | Tapia |
| 2019/0082320 A1* | 3/2019 | Avasarala ........... H04L 63/0876 |
| 2019/0179649 A1* | 6/2019 | Kadambala ........... H04L 67/535 |
| 2021/0076196 A1 | 3/2021 | Kumar et al. |

* cited by examiner

SYSTEM AND METHOD TO MODIFY RADIO ACCESS NETWORK (RAN) FEATURES

CROSS REFERENCE TO RELATED APPLICATIONS

This application is a continuation of U.S. patent application Ser. No. 16/945,583, filed on Jul. 31, 2020, and also claims priority to Indian Patent Application No. 201921030967, filed Jul. 31, 2019, the disclosure of which applications are hereby incorporated herein by reference.

TECHNICAL FIELD

The technical field generally relates to the field of wireless communication systems, and more particularly, to a system and method of modifying radio access network (RAN) features of one or more erroneous users.

BACKGROUND OF THE DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Today a widely deployed wireless network, in order to provide various communication services such as voice, video, data, advertisement, content and messaging broadcasts, etc., usually comprises multiple access networks and support communications for multiple users by sharing the available network resources.

One example of such a network is the Evolved Universal Terrestrial Radio Access (E-UTRA) which is a radio access network standard meant to be a replacement of the Universal Mobile Telecommunications System (UMTS) and High-Speed Downlink Packet Access/High-Speed Uplink Packet Access (HSDPA/HSUPA) technologies specified in 3GPP releases 5 and beyond. Unlike HSPA, Long Term Evolution's (LTE's) E-UTRA is an entirely new air interface system, unrelated to and incompatible with W-CDMA. It provides higher data rates, lower latency and is optimized for packet data. The earlier UMTS Terrestrial Radio Access Network (UTRAN) is the radio access network (RAN), defined as a part of the Universal Mobile Telecommunications System (UMTS), a third-generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High-Speed Packet Access (HSPA), which provides higher data transfer speeds and capacity to associated UMTS networks. Furthermore, as the demand for mobile data and voice access continues to increase, research and development also continue to advance the technologies not only to meet the growing demand for access, but to advance and enhance the user experience with user device. Some of the technologies that have evolved starting GSM/EDGE, UMTS/HSPA, CDMA2000/EV-DO and TD-SCDMA radio interfaces with the 3GPP Release 8, e-UTRA are designed to provide a single evolution path for providing increases in data speeds, and spectral efficiency, and allowing the provision of more functionality.

A 'smart computing device or user equipment (UE) or user device' refers to any electrical, electronic, electro-mechanical and/or computing device or equipment or a combination of one or more of the above devices. Also, a 'smartphone' is one type of "smart computing device" that refers to a mobility wireless cellular connectivity device that allows end-users to use services on 2G, 3G, 4G and the like mobile broadband Internet connections with an advanced mobile operating system which combines features of a personal computer operating system with other features useful for mobile or handheld use.

Furthermore, in order to provide various implementations relating to a user equipment (UE), network/s are generally configured to receive from the user equipment, different information relating to the user equipment (UE) capability. Further, a UE capability message comprises of radio capabilities and feature group indicators (FGI) bits, for various features. Below, is an example of FGI bits in a UE capability message:

RRC feature Group Indicators='11111110 00001101 11011000 10000000'

Also, in the above example, the indexing starts from index 1, which is the leftmost bit in the field.

Furthermore, in the current scenario, it is not possible to disable selective RAN features for particular erroneous user device or group of devices. Therefore, this further leads to a condition where network resources may be used but wasted with loss of throughput.

Also, in certain situations, it becomes difficult for service operator/s to maintain user/customers with the erroneous device on the network without blocking/barring them completely. At present RAN features are enabled or disabled on the eNodeB only, which is responsible for coverage at a specific area. Thus, disabling any feature on the whole, the eNodeB will cause the absence of that particular feature in the entire coverage of that area. Hence, all the UEs in that area will miss the benefits of performance of that particular feature though only a few UEs are having performance issues with that particular feature.

Currently, there are no solutions available to reduce the misuse of radio resources by some specific erroneous user devices in a particular network area.

Therefore, in view of these and other existing limitations, there is an imperative need to provide a solution to overcome the limitations of prior existing solutions and to provide methods and systems for identifying Erroneous UE(s) and for modifying radio access network (RAN) features of user equipment(s) (UE) to reduce the misuse of radio resources by erroneous user devices and also to improve network KPIs.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present disclosure is to provide a method and system of modifying radio access network (RAN) features of one or more user equipment (UE). Another object of the present invention is to reduce the misuse of radio resources by the user devices by disabling their RAN feature that hampers the network and thereby improving network KPIs. Also, an object of the present invention is to save a considerable amount of network resources which can be used for accommodating more users or any other use case based on the service operator's needs. Another object of the present invention is to provide improved throughput for network subscriptions in multi-SIM, multi-active wireless devices by reducing the misuse of radio resources by the user devices. Also, an object of the present invention is to prevent lower layer retransmissions from happening and to conserve radio resources that are wasted in carrying those retransmissions earlier. Another object of the present invention is to allow for increased throughput performance and prevent substantial decline in average throughput. Another object of the present invention is to benefit end users by neutralizing the adverse effect of the above limitation and rendering better user experience. An object of the present invention is to provide a device ecosystem that provides a seamless enhancement of session in multi-SIM, multi-active wireless devices. Yet another object of the present invention is to reduce the misuse of radio resources by the user devices independent of whether the UE is 5G/4G/3G/EV-Do/eHRPD capable technology.

Furthermore, in order to achieve the aforementioned objectives, the present invention provides a method and system for modifying radio access network (RAN) features of one or more user equipment (UE). A first aspect of the present invention relates to a method for modifying the radio access network (RAN) features of the one or more user equipment (UE). The method comprising receiving, at an UE segregation server unit from a network performance unit (NPU), at least one Type Allocation Code (TAC) information of a set of user equipment. The method thereafter comprises receiving, at the UE segregation server unit from a Mobility Management Entity (MME), a UE capability information of one or more UE. The method further encompasses comparing, via the UE segregation server unit, at least one Type Allocation Code (TAC) information present in each of the received UE capability information with the at least one TAC information of the set of user equipment. Further, the method comprises identifying, via the UE segregation server unit, one or more erroneous UE from the one or more UE based on a successful comparison of the at least one TAC information present in each of the received UE capability information of the one or more UE with the at least one TAC information of the set of user equipment. The method thereafter encompasses modifying, via the UE segregation server unit, the UE capability information of the one or more identified erroneous UE.

Another aspect of the present invention relates to a system for modifying radio access network (RAN) features of one or more user equipment (UE). The system comprises an UE segregation server unit configured to receive, from a network performance unit (NPU), at least one Type Allocation Code (TAC) information of a set of user equipment. The UE segregation server unit is thereafter configured to receive, from a Mobility Management Entity (MME), a UE capability information of one or more UE. Thereafter, the UE segregation server unit is configured to compare, at least one Type Allocation Code (TAC) information present in each of the received UE capability information with the at least one TAC information of the set of user equipment. Further, the UE segregation server unit is configured to identify, one or more erroneous UE from the one or more UE based on a successful comparison of the at least one TAC information present in each of the received UE capability information of the one or more UE with the at least one TAC information of the set of user equipment. Thereafter, the UE segregation server unit is configured to modify, the UE capability information of the one or more identified erroneous UE.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

Figure 1:
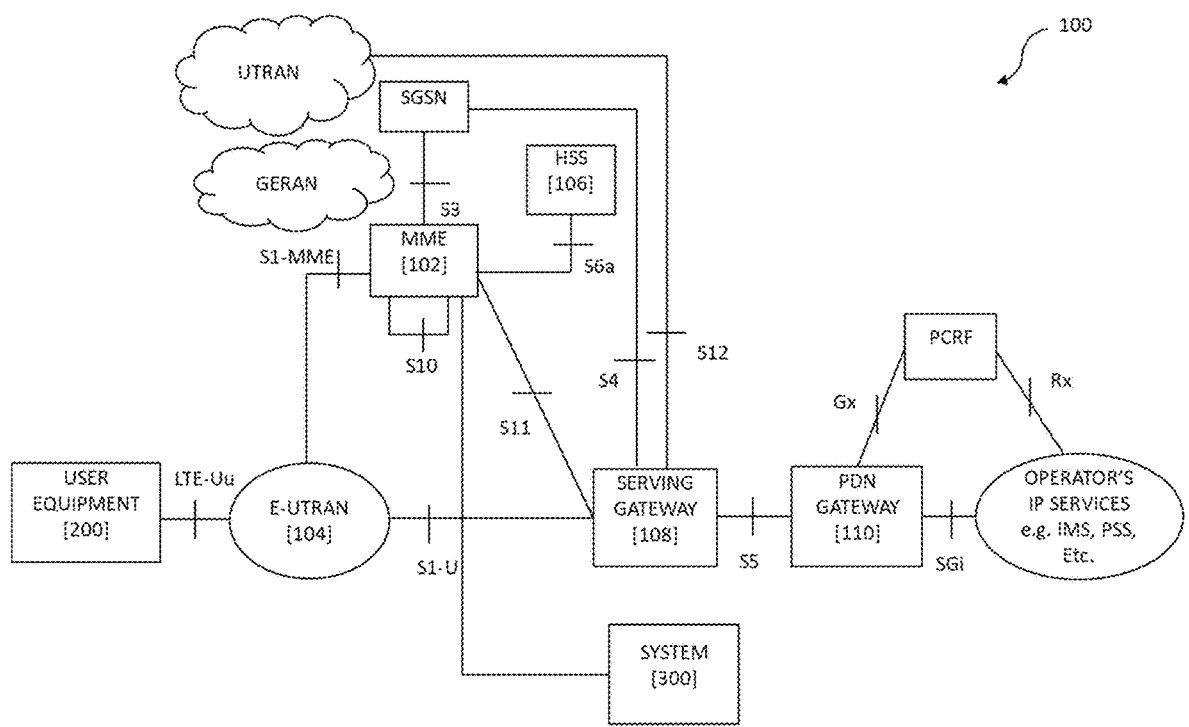
FIG. 1 illustrates an exemplary network architecture diagram [100], in accordance with exemplary embodiments of the present invention.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be any apparatus that provides specific functionality through electronic components without mechanical parts, the electronic components can include a processor therein to execute software or firmware that confers at least in part the functionality of the electronic components.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive etc.).

Moreover, terms like "user equipment" (UE), "mobile station", "user device", "mobile subscriber station," "access terminal," "terminal," "smartphone," "smart computing device," "handset," and similar terminology refers to any electrical, electronic, electro-mechanical or an equipment or a combination of one or more of the above devices. Smart computing devices may include, but not limited to, a mobile phone, smart phone, virtual reality (VR) devices, augmented reality (AR) devices, pager, laptop, a general-purpose computer, desktop, personal digital assistant, tablet computer, mainframe computer, or any other computing device as may be obvious to a person skilled in the art. In general, a smart computing device is a digital, user configured, computer networked device that can operate autonomously. A smart computing device is one of the appropriate systems for storing data and other private/sensitive information. The said device operates at all the seven levels of ISO reference model, but the primary function is related to the application layer along with the network, session and presentation layer with any additional features of a touch screen, apps ecosystem, physical and biometric security, etc. Further, a 'smartphone' is one type of "smart computing device" that refers to the mobility wireless cellular connectivity device that allows end-users to use services on 2G, 3G, 4G and the like mobile broadband Internet connections with an advanced mobile operating system which combines features of a personal computer operating system with other features useful for mobile or handheld use. These smartphones can access the Internet, have a touchscreen user interface, can run third-party apps including the capability of hosting online applications, music players and are camera phones possessing high-speed mobile broadband 4G LTE internet with video calling, hotspot functionality, motion sensors, mobile payment mechanisms and enhanced security features with alarm and alert in emergencies. Mobility devices may include smartphones, wearable devices, smart-watches, smart bands, wearable augmented devices, etc. For the sake of specificity, we will refer to the mobility device to both feature phone and smartphones in this disclosure but will not limit the scope of the disclosure and may extend to any mobility device in implementing the technical solutions. The above smart devices including the smartphone as well as the feature phone including IoT devices enable the communication on the devices. Furthermore, the foregoing terms are utilized interchangeably in the subject specification and related drawings.

Furthermore, the terms "user," "subscriber," "customer," "consumer," "agent,", "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formulations, that can provide simulated vision, sound recognition, decision making, etc. In addition, the terms "wireless network" and "network" are used interchangeable in the subject application, unless context warrants particular distinction(s) among the terms.

As used herein, a "processor" or "processing unit" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, a low-end microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

The terms "wireless communications site", "base station", "network entity", "Network", "Node B," "evolved Node B" (eNodeB), and the like are utilized interchangeably in the subject specification and drawings and refer to devices that can receive and transmit signal(s) from and to wireless devices, or act as a wireless network component or apparatus that sends and/or receives data associated with voice, video, sound, and/or substantially any data-stream or signaling-stream between a set of subscriber stations—unless context warrants particular distinction(s) among the terms. Further, the data and signaling streams can be packetized or frame-based flows.

As used herein, "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

The present invention in order to save network resources, reduces the misuse of radio resources by user devices. The present invention provides a solution to modify radio access network (RAN) features of one or more user equipment. Further, the present invention provides a solution to disable the radio access network (RAN) features of the one or more user equipment. The present invention by implementation of its unique and novel features, provides an improved network spectral efficiency and also saves precious radio resources. Furthermore, the present invention in order to modify the one or more RAN features of the one or more user equipment, segregates one or more erroneous user equipment from one or more UEs, based on their corresponding IMEI TAC details and their corresponding RAN feature/s which are degrading network KPI's. The present invention also maintains a database comprising at least one TAC information of a set of user equipment comprising the one or more erroneous user equipment. Further, the present invention based on a UE ON state and/or in RRC Idle to RRC connected state, compares a TAC information associated with a UE capability information of the one or more UE with a TAC information of the set of user equipment comprising one or more erroneous user equipment. Further, the present invention identifies one or more erroneous UE from the one or more UE in an event if any of the particular TAC information associated with the UE capability information of the one or more UE successfully matches with the TAC information of the set of user equipment comprising one or more erroneous user equipment. The present invention thereafter modifies the UE capability information of the one or more identified erroneous UEs. Further, the present invention encompasses transmitting an updated UE Capability Indication to MME, wherein the updated UE Capability Indication is transmitted to disable certain radio capabilities which are causing some malfunction in the network.

Hereinafter, exemplary embodiments of the present disclosure will be described in detail with reference to the accompanying drawings so that those skilled in the art can easily carry out the present disclosure.

Referring to FIG. 1, an exemplary network architecture diagram [100], in accordance with exemplary embodiments of the present invention is shown.

As shown in FIG. 1, the network architecture diagram comprises a number of components/units such as including but not limited to a Mobility Management Entity (MME) [102], an Evolved Universal Terrestrial Access Network (E-UTRAN) [104], a Home Subscriber Server (HSS) [106], a serving gateway [108], a Packet Data Network (PDN) gateway [110], a Serving GPRS Support Node (SGSN), a UMTS Terrestrial Radio Access Network (UTRAN), a GSM/EDGE Radio Access Network (GERAN), a policy and charging rules function (PCRF) etc. Further, only the units/components of the network architecture diagram [100] that are important and are required to define the present invention more clearly are explained here. Also, the components as shown in the network architecture diagram [100] are connected with each other over various interfaces such as the MME [102] is connected to the E-UTRAN [104] over an S1-MME interface and the MME [102] is connected to the HHS [106] over an S6a interface etc.

Further, the MME (Mobility Management Entity) [102] is configured to handle signaling related to mobility and security for E-UTRAN access. The MME [102] is responsible for tracking and paging of one or more UEs in idle-mode. The MME [102] is also a termination point of a Non-Access Stratum (NAS).

The E-UTRAN [104] comprises a set of eNodeBs connected to Evolved Packet Core (EPC) through an S1 interface. Further, an eNodeB can support Frequency Division Duplex (FDD) mode, Time Division Duplex (TDD) mode or dual-mode operation. Also, the eNodeB is responsible for assigning one or more radio resources to the one or more UEs.

Further, the HSS (Home Subscriber Server) [106] is a database that contains user-related and subscriber-related information. The HSS [106] also provides support functions in mobility management, call and session setup, user authentication and access authorization.

Furthermore, the gateways (i.e. the Serving GW [108] and the PDN GW [110]) deal with a user plane. These gateways are configured to transport an IP data traffic between the one or more User Equipment (UE) and one or more external networks. The Serving GW [108] is a point of interconnect between a radio-side and an EPC. Further, the Serving GW [108] serves the one or more UEs by routing an incoming and outgoing IP packets. Also, the Serving GW [108] is an anchor point for an intra-LTE mobility (i.e. in case of handover between eNodeBs) and for mobility between an LTE and other 3GPP accesses. Also, the Serving GW [108] is logically connected to other gateway, i.e. to the PDN GW [110].

The PDN GW [110] is a point of interconnect between the EPC and the external IP networks. The PDN GW [110] routes packets to and from one or more Packet Data Networks (PDNs). The PDN GW [110] also performs various functions such as IP address/IP prefix allocation or policy control and charging etc.

Further, the FIG. 1 also indicates that a user equipment [200] is connected with E-UTRAN [104] and a system [300] is connected with the MME [102].

The user equipment (UE) [200] is latched to the E-UTRAN [104] to avail at least one service from a corresponding network entity. Also, the user equipment [200] is configured to provide the MME [102] via the eNodeB, a UE capability information/message of the UE [200], wherein the UE capability information further comprises various information such as details of radio capabilities, international mobile equipment identity (IMEI), Type Allocation Code (TAC) and feature group indicators (FGI) bits etc.

Figure 2:
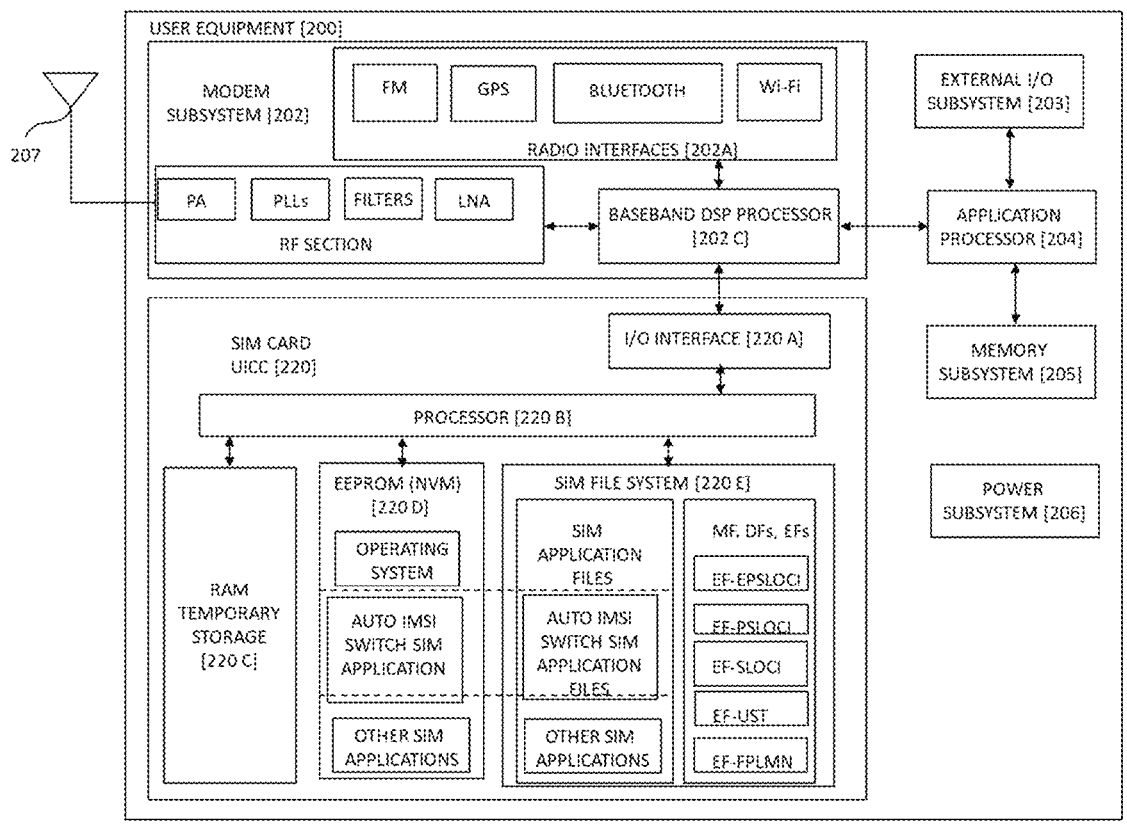
FIG. 2 illustrates an exemplary block diagram of a UE [200], in accordance with exemplary embodiments of the present invention.

Also, FIG. 2 illustrates an exemplary block diagram of a user equipment [200], in accordance with exemplary embodiments of the present invention. The user equipment [200] as indicated in the FIG. 2 comprises at least one subscriber identity module (SIM)/universal integrated circuit card (UICC) [220]. The SIM [220] is configured inside the user equipment [200] for providing various functionalities in accordance with the present disclosure. The user equipment [200] further may comprise a plurality of subsystems [202, 202A, 202B, 202C, 203, 204, 205 and 206], wherein said subsystems [202, 202A, 202B, 202C, 203, 204, 205 and 206] may include, but not limiting to, a modem subsystem [202] with a Baseband DSP processor [202C] and a plurality of radio interfaces [202A]. The user equipment [200] may further include a cellular radio, a transmission/reception radio frequency (RF) connected to the antenna [207] for receiving and transmitting wireless services such as VoIP and Internet/Intranet services. Also, the user equipment [200] may comprise an application processor [204], a memory subsystem [205], a power subsystem [206] and an external I/O interfaces subsystem [203]. The present disclosure further encompasses that the subscriber identity module [220] may comprise a processor [220B], an I/O interface [220A], a RAM temporary storage [220C], an EEPROM/Non-volatile Memory (NVM) [220D] and a SIM file system [220E]. Further, the EEPROM/Non-Volatile Memory (NVM) [220D] may consist of an operating system code, a code of other SIM applications and the Auto International Mobile Subscriber Identity (IMSI) Switch SIM application. The SIM file system [220E] and USIM application may contain elementary files and location parameters such as EFLOCI (Location Information), EFPSLOCI (PS Location Information), EFEPSLOCI (PS Location Information) and various other application-specific files used by various SIM applications running on the subscriber identity module [220] along with a plurality of context and configuration files of the Auto IMSI Switch SIM application.

The system [300] is configured to identify at least one Type Allocation Code (TAC) information of one or more user equipment, based on an analysis of one or more key performance indicators (KPIs) over a period of time. Also, the system [300] is further configured to process one or more UE capability information (or for instance Non-access stratum (NAS) information) received from the MME [102], wherein the system [300] is configured to identify one or more user equipment as one or more erroneous UE and the system [300] is also configured to process the UE capability information in order to modify radio access network (RAN) features of one or more user equipment (UE). Thereafter, the system [300] is further configured to transmit the modified UE Capability information to the MME [102].

Further, the MME [102] is configured to process the modified NAS information/UE capability information received from the system [300], in order to further enable the eNodeB/Base Terminal Station/gNodeB (eNB/BTS/NR-gNB) to disable particular UE capabilities which are degrading the one or more KPIs.

Figure 3:
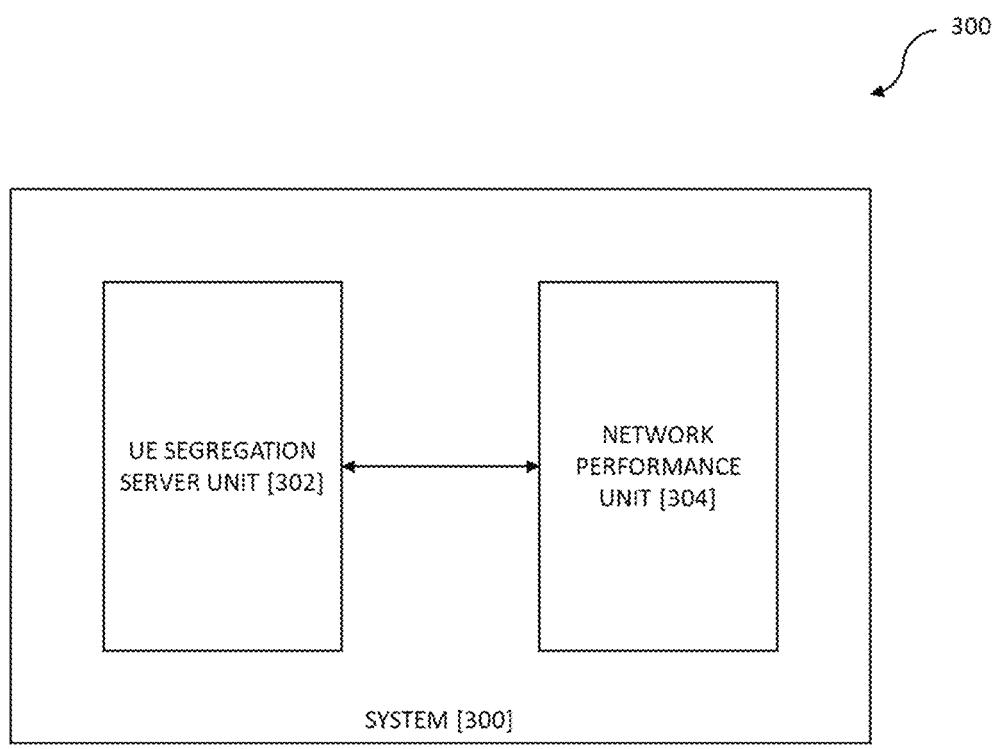
FIG. 3 illustrates an exemplary block diagram of a system [300] for modifying radio access network (RAN) features of one or more user equipment (UE), in accordance with exemplary embodiments of the present invention.

Referring to FIG. 3, an exemplary block diagram of a system [300], for modifying radio access network (RAN) features of one or more user equipment (UE), in accordance with exemplary embodiments of the present invention is shown.

The system [300] comprises at least one UE segregation server unit [302] and at least one network performance unit (NPU) [304]. In an instance, the system [300] is implemented at a network entity and in such instance, the system [300] is connected to an MME [102] of said network entity.

Also, all of the components/units of the system [300] are assumed to be connected to each other unless otherwise indicated below. Also, in FIG. 3 only a few units are shown, however, the system [300] may comprise multiple such units or the system [300] may comprise any such numbers of said units, obvious to a person skilled in the art or as required to implement the features of the present disclosure.

The system [300], is configured to modify radio access network (RAN) features of one or more user equipment (UE), with the help of the interconnection between the components/units of the system [300].

The at least one network performance unit (NPU) [304] is connected to the at least one UE segregation server unit [302]. The network performance unit (NPU) [304] is configured to identify at least one Type Allocation Code (TAC) information of a set of user equipment comprising one or more erroneous user equipment, based on an analysis of one or more key performance indicators (KPIs) over a period of time. Also, the at least one TAC information of the set of user equipment comprising the one or more erroneous user equipment further comprises one or more international mobile equipment identity (IMEI) TAC details and the one or more RAN features of the set of user equipment comprising the one or more erroneous user equipment that are required to be modified. For instance, the network performance unit (NPU) [304] is configured to analyze one or more consistently degrading KPIs over a particular period of time and thereafter the NPU [304] based on said analysis, is further configured to identify one or more worst-performing TACs (IMEI based) for which one or more RAN features are required to be disabled.

The at least one UE segregation server unit [302] is connected to the at least one network performance unit (NPU) [304]. The UE segregation server unit [302] configured to receive, from the network performance unit (NPU) [304], the at least one Type Allocation Code (TAC) information of the set of user equipment comprising the one or more erroneous user equipment. Further, in an instance, the UE segregation server unit [302] may also be configured to receive the at least one TAC information of the set of user equipment comprising the one or more erroneous user equipment, from an UE segregation server unit graphical user interface (GUI). Also, the UE segregation server unit [302] is further configured to maintain, at least one database comprising the at least one TAC information of the set of user equipment comprising the one or more erroneous user equipment. For instance, the database may comprise one or more international mobile equipment identity (IMEI) TAC details and one or more RAN features of the set of user equipment comprising the one or more erroneous user equipment that are required to be modified.

Further, the UE segregation server unit [302] is configured to receive, from a Mobility Management Entity (MME) [102], a UE capability information of one or more UE [200]. Also, the UE segregation server unit [302] is further configured to receive from the MME [102], the UE capability information, based on at least one event indicating, a receipt of the UE capability information at the MME [102] from the one or more UE [200] and a receipt of a NAS SERVICE REQ at the MME [102] from the one or more UE [200]. Further, the receipt of the UE capability information at the MME [102] from the one or more UE [200] is based on an event indicating the one or more UE [200] is powered on. Also, the receipt of a NAS SERVICE REQ at the MME [102] from the one or more UE [200] is based on an event indicating that a UE RRC state of the one or more UE is transit from RRC-Idle to RRC-Connected.

Thereafter, the UE segregation server unit [302] is configured to compare, at least one Type Allocation Code (TAC) information present in each of the received UE capability information with the at least one TAC information of the set of user equipment comprising the one or more erroneous user equipment.

The UE segregation server unit [302] is thereafter configured to identify, one or more erroneous UE from the one or more UE [200] based on a successful comparison of the at least one TAC information present in each of the received UE capability information of the one or more UE [200] with the at least one TAC information of the set of user equipment comprising the one or more erroneous user equipment. Also, in an instance if a TAC information present in a UE capability information/message received from a UE [200] does not match with at least one TAC information of the set of user equipment comprising the one or more erroneous user equipment present in a database maintained by an UE segregation server unit [302], the UE [200] in such instance will not be identified as an erroneous user equipment.

Further the UE segregation server unit [302] is configured to modify, the UE capability information of the one or more identified erroneous UEs. Also, the UE segregation server unit [302], in order to modify the UE capability information of the one or more identified erroneous UEs, is further configured to, analyse the UE capability information to identify one or more RAN features degrading one or more KPIs of the one or more identified erroneous UE. Further, the UE segregation server unit [302] is configured to modify, at least one bit status of the identified one or more RAN features.

The UE segregation server unit [302] is further configured to transmit to the MME [102], the modified UE capability information to disable one or more RAN features of the one or more identified erroneous UE.

Figure 4:
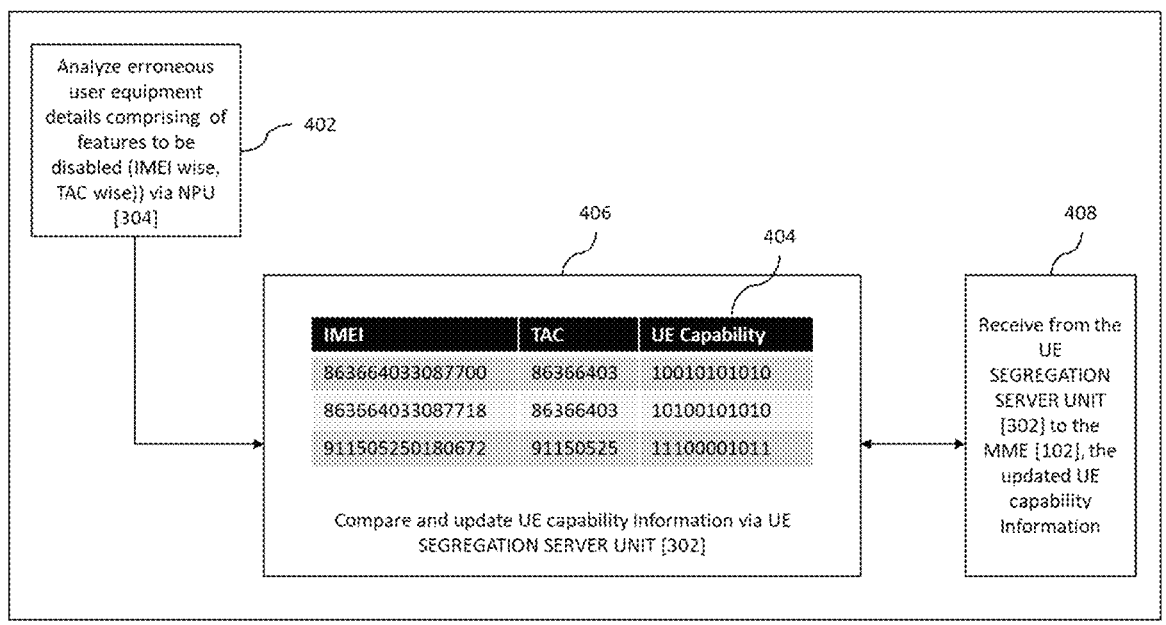
FIG. 4 illustrates an exemplary diagram, depicting an instance of modification of radio access network (RAN) features of one or more user equipment (UE), in accordance with exemplary embodiments of the present invention.

Referring to FIG. 4 an exemplary diagram, depicting an instance of modification of radio access network (RAN) features of one or more user equipment (UE), in accordance with exemplary embodiments of the present invention is shown.

At [402], the FIG. 4 indicates that a network performance unit (NPU) [304] is configured to analyse a set of user equipment comprising one or more erroneous user equipment details comprising of one or more RAN features to be disabled (IMEI wise, TAC wise). For instance, the network performance unit (NPU) [304] is first configured to analyse one or more KPIs associated with one or more UEs and further based on one or more degrading KPIs the NPU [304] further identifies the set of user equipment comprising the one or more erroneous user equipment. Further the NPU [304] is configured to analyse the set of user equipment comprising the one or more erroneous user equipment details comprising of the one or more RAN features required to be disabled. For instance, IMEI details of the one or more erroneous user equipment, TAC details of the one or more erroneous user equipment and the one or more RAN features that are required to be disabled are analysed by the NPU [304]. The NPU [304] is thereafter configured to transmit the set of user equipment comprising the one or more erroneous user equipment details to a UE segregation server unit [302].

Further upon receipt of the set of user equipment comprising the one or more one or more erroneous user equipment details, the UE segregation server unit [302] is configured to maintain a database of said set of user equipment comprising the one or more one or more erroneous user equipment details. At [404] an exemplary database comprising IMEI details, TAC details and UE capability information is shown.

Further, the UE segregation server unit [302] is configured to receive from an MME [102] a UE capability information of one or more UEs [200] based on at least one event indicating, a receipt of the UE capability information at the MME [102] from the one or more UEs and a receipt of a NAS SERVICE REQ at the MME [102] from the one or more UEs.

Thereafter, at [406], the UE segregation server unit [302] is configured to compare the received UE capability information of one or more UEs [200] with the set of user equipment comprising the one or more one or more erroneous user equipment details present in the database. Further, in an event of successful comparison, the UE segregation server unit [302] is further configured to update the successfully matched UE capability information by modifying, at least one bit status of one or more RAN features that are required to be modified in the successfully matched UE capability information of the one or more UEs.

Further, at [408], the MME [102] is configured to receive from the UE segregation server unit [302], the updated UE capability information of the one or more UEs [200], in order to further disable one or more RAN features which are causing some malfunction in a corresponding network of the MME [102].

Therefore, the system [300] is configured to reduce the misuse of one or more radio resources by one or more UEs by disabling one or more RAN feature of said one or more UEs.

Figure 5:
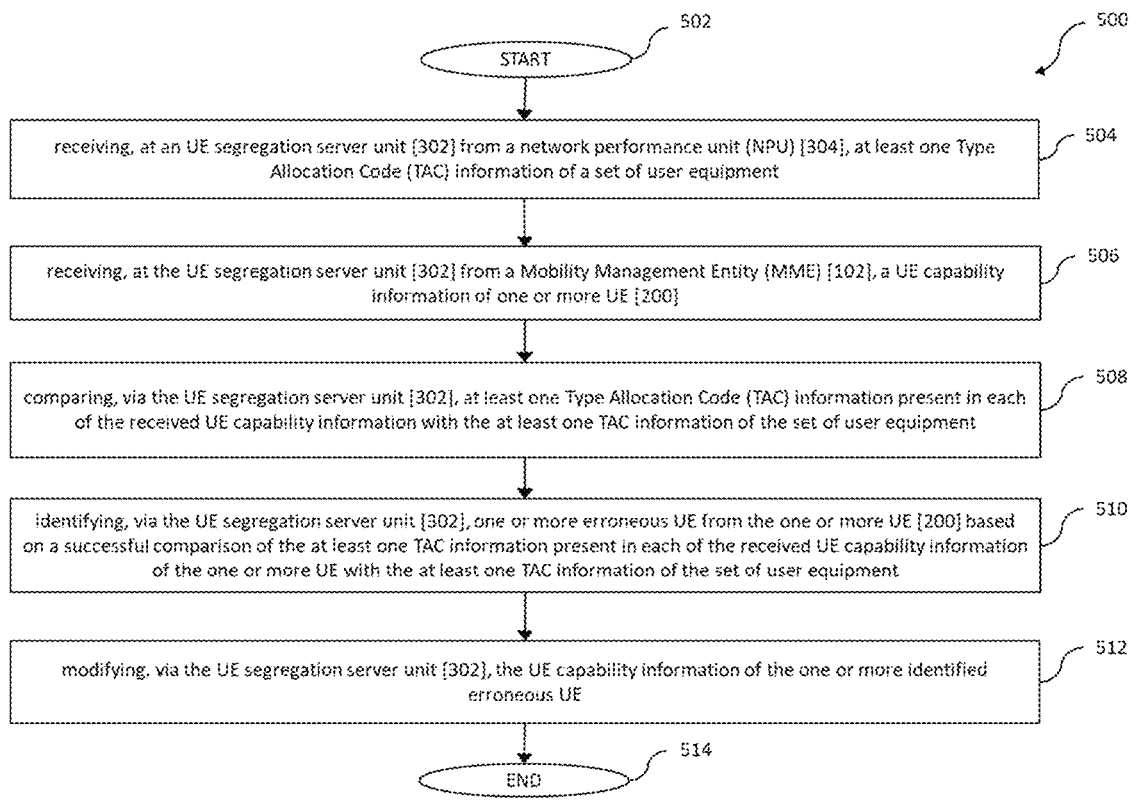
FIG. 5 illustrates an exemplary method flow diagram [500], depicting a method of modifying radio access network (RAN) features of one or more user equipment (UE), in accordance with exemplary embodiments of the present invention.

Referring to FIG. 5 an exemplary method flow diagram [500], depicting a method of modifying radio access network (RAN) features of one or more user equipment (UE), in accordance with exemplary embodiments of the present invention is shown. As shown in FIG. 5, the method begins at step [502].

At step [504], the method comprises receiving, at an UE segregation server unit [302] from a network performance unit (NPU) [304], at least one Type Allocation Code (TAC) information of a set of user equipment. Further the set of user equipment comprises one or more erroneous user equipment. Further, in an instance the method may also comprise receiving at the UE segregation server unit [302], the at least one TAC information of the set of user equipment comprising the one or more erroneous user equipment, from a UE segregation server unit graphical user interface (GUI). Also, the at least one TAC information of the set of user equipment comprising the one or more erroneous user equipment is identified via the NPU [304], based on an analysis of one or more key performance indicators (KPIs) over a period of time. Also, the at least one TAC information of the set of user equipment comprising the one or more erroneous user equipment further comprises one or more international mobile equipment identity (IMEI) TAC details and the one or more RAN features of the one or more erroneous user equipment that are required to be modified. For instance, the method encompasses analyzing via the network performance unit (NPU) [304], one or more consistently degrading KPIs over a particular period of time and thereafter the method based on said analysis, further comprises identifying via the NPU [304], one or more worst-performing TACs (IMEI based) for which one or more RAN features are required to be disabled. Also, in an example, the IMEI TAC details may comprise an IMEI detail such as IMEI 921405250180672 and a corresponding TAC detail such as 92140525.

Further, the method also encompasses maintaining, at the UE segregation server unit [302], at least one database comprising the at least one TAC information of the set of user equipment comprising the one or more erroneous user equipment. For instance, the database may comprise one or more international mobile equipment identity (IMEI) TAC details and one or more RAN features of the set of user equipment comprising the one or more erroneous user equipment, that are required to be modified. Also, an exemplary database comprising IMEI and TAC details is provided below in Table 1:

TABLE 1

| IMEI | TAC | UE Capability |
|---|---|---|
| 822264033087700 | 82226403 | 11010101110 |
| 636864033087718 | 63686403 | 10110001010 |
| 822405250180672 | 82240525 | 10101001011 |

Next, at step [506], the method comprises receiving, at the UE segregation server unit [302] from a Mobility Management Entity (MME) [102], a UE capability information of one or more UE [200]. Further, the receiving, at the UE segregation server unit [302] from an MME [102], a UE capability information further comprises receiving the UE capability information based on at least one event indicating, a receipt of the UE capability information at the MME [102] from the one or more UE [200] and a receipt of a NAS SERVICE REQ at the MME [102] from the one or more UE [200]. The receipt of the UE capability information at the MME [102] from the one or more UE [200] is based on an event indicating the one or more UE is powered on. Also, the receipt of the NAS SERVICE REQ at the MME [102] from the one or more UE [200] is based on an event indicating that a UE RRC state of the one or more UE is transit from RRC-Idle to RRC-Connected.

Next, at step [508], the method comprises comparing, via the UE segregation server unit [302], at least one Type Allocation Code (TAC) information present in each of the received UE capability information with the at least one TAC information of the set of user equipment comprising the one or more erroneous user equipment.

Next, at step [510], the method comprises identifying, via the UE segregation server unit [302], one or more erroneous UE from the one or more UE based on a successful comparison of the at least one TAC information present in each of the received UE capability information of the one or more UE [200] with the at least one TAC information of the set of user equipment comprising the one or more erroneous user equipment. Also, in an instance if a TAC information present in a UE capability information/message received from a UE [200] does not match with at least one TAC information of the set of user equipment comprising the one or more erroneous user equipment present in a database maintained by an UE segregation server unit [302], the UE [200] in such instance will not be identified as an erroneous user equipment.

Next, at step [512], the method comprises modifying, via the UE segregation server unit [302], the UE capability information of the one or more identified erroneous UE. Also, the modifying, via the UE segregation server unit [302], the UE capability information further comprises analysing, the UE capability information to identify one or more RAN features degrading one or more KPIs of the one or more identified erroneous UE and thereafter modifying, at least one bit status of the identified one or more RAN features.

The method further comprises transmitting from the UE segregation server unit [302] to the MME [102], the modified UE capability information to disable one or more RAN features of the one or more identified erroneous UE.

After modifying the radio access network (RAN) features of the one or more user equipment (UE), the method further terminates at step [514].

Furthermore, an exemplary implementation of the present invention in an instance indicating a handover between a Time Division Duplex (TDD) and a Frequency Division Duplex (FDD) is described as below: For instance, in the above-stated scenario, a UE capability information of one or more UEs may comprise an RRC feature group indicators='11111110 00001101 11011000 10000100'. Further, some details relating to the 13$^{th}$, 25$^{th}$ and 30$^{th}$ bits of the RRC feature group indicators='11111110 00001101 11011000 10000100' are provided below in Table 2:

TABLE 2

| Bit | Definition | Note | FDD/TDD |
| --- | --- | --- | --- |
| 13 | Inter-frequency handover within FDD or TDD | Bit 25 = 1 | YES |
| 25 | Inter-frequency measurements and reporting in E-UTRA connected mode | | YES |
| 30 | Handover between FDD and TDD | Bit 13 = 1 | YES |

Further, for TDD to FDD handover if the one or more UEs sends BIT 30 in FGI set to 1, this indicates to a network that said one or more UEs supports FDD to TDD or TDD to FDD handover. As a result, eNodeB initiates a TDD→FDD handover. However, in spite of UE support, in some instance, the one or more UEs may misbehave, and therefore failures are observed causing poor Network KPIs and misuse of resources. For such instances, one or more RAN features of such one or more UEs (identified as one or more erroneous UEs) that are required to be modified to save network resources, may be disabled by implementing the features of the present invention.

Furthermore, upon implementation of the features of the present invention in the above-provided instances when eNodeB (eNB) receives a UE capability information from the one or more UEs, the eNB forwards the received UE capability information to MME [102]. Further, the MME [102] transmits the UE capability information to an UE segregation server unit [302]. The UE segregation server unit [302] is configured to update the received UE capability information with FGI Bit 13/25/30 as 0. Thereafter the UE segregation server unit [302] sends the updated UE capability information back to the eNodeB. Further, the eNodeB considers the corresponding feature of the one or more user equipment for which the updated UE capability information is received, as disabled.

Figure 6:
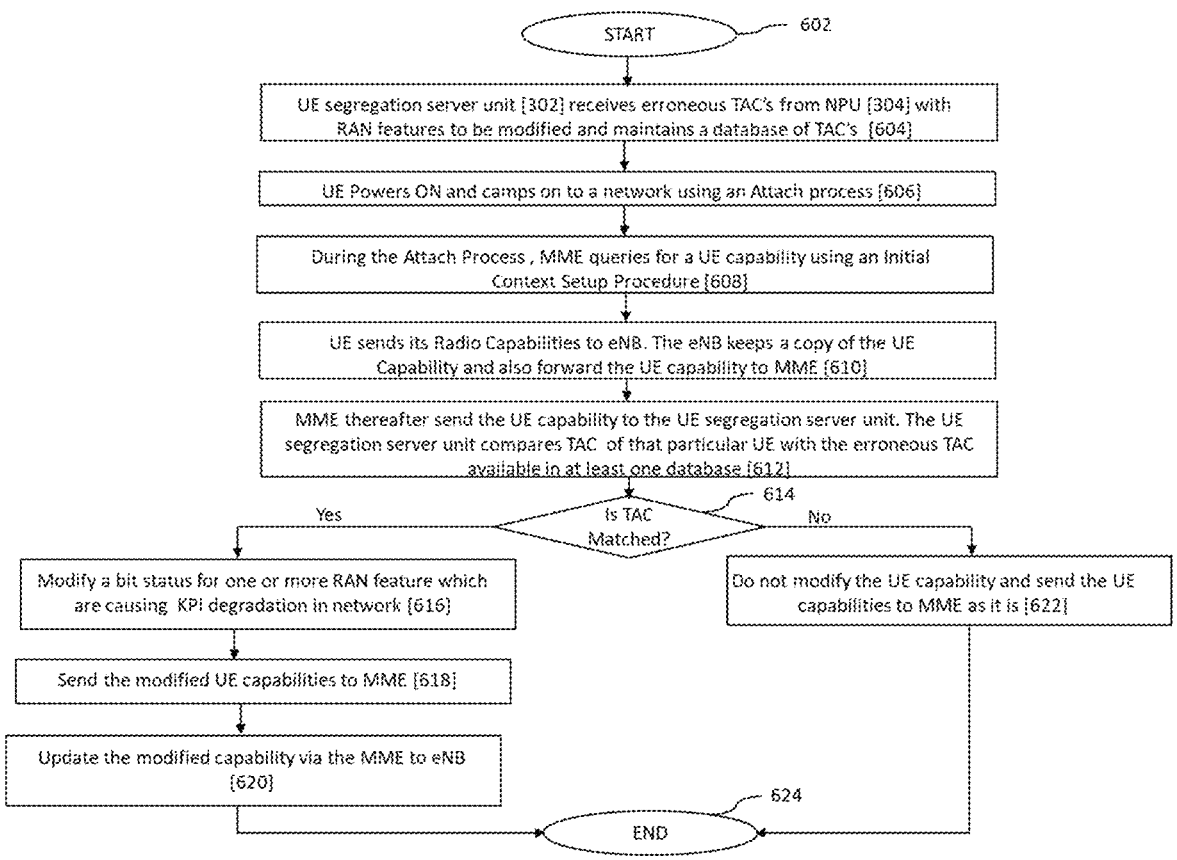
FIG. 6 illustrates an exemplary flow diagram, depicting an instance implementation of the process of modifying radio access network (RAN) features of one or more user equipment (UE), in accordance with exemplary embodiments of the present invention.

Referring to FIG. 6, an exemplary flow diagram, depicting an instance implementation of the process of modifying radio access network (RAN) features of one or more user equipment (UE), in accordance with exemplary embodiments of the present invention is shown. Furthermore, the FIG. 6 indicates the process of modifying the radio access network (RAN) features of the one or more user equipment (UE) in an event one or more UE [200] are powered ON.

As shown in FIG. 6, the process starts at step [602]. Thereafter, at step [604] the method encompasses receiving erroneous TAC's information from an NPU [304] with RAN features to be modified due to which one or more network KPI's are getting degraded. The erroneous TAC's information may further comprise at least one TAC information of the one or more erroneous user equipment. Also, at step [604] the method encompasses maintaining, at the UE segregation server unit [302], at least one database comprising the at least one TAC information of the one or more erroneous user equipment.

Next, at step [604] an instance of powering ON of the one or more UE is indicated. Further, as the one or more UE is Power ON, the one or more UE gets camped to a corresponding network using an attach procedure i.e. by sending ATTACH REQ. Further, during the attach process the one or more UE exchanges its radio capabilities (software & hardware) with the network.

Next, at step [608], during the attach process/procedure, an MME [102] of the corresponding network queries for a UE capability using an Initial Context Setup Procedure [608]. For instance, once the MME [102] receives an ATTACH REQ from a UE [200], the MME [102] queries for the UE's UE capabilities by sending an initial context setup request to eNodeB and thereafter the eNodeB further queries the UE [200] via a UE capability enquiry.

Next, at step [610], the one or more UE [200] sends details of its radio capabilities to the eNB. The eNB thereafter keeps a copy of the UE Capability and also forwards the UE capability to the MME [102]. For instance, the one or more UE [200] sends the details of its radio capabilities to the eNB as a UE capability information message.

Next, at step [612], once the MME [102] receives the UE capability of the one or more UE, the MME [102] sends the UE capability to the UE segregation server unit [302]. Thereafter, the UE segregation server unit [302] compares TAC of that particular UE (i.e. the one or more UE associated with the received UE capability) with the erroneous TAC available in the at least one database.

Further, at step [614], the method encompasses identifying whether the TAC of the one or more UE associated with the received UE capability matches with the erroneous TAC available in the at least one database or not. Further, in an event of successful comparison, the method leads to step [616] and otherwise, the method leads to step [622].

Next, at step [616] the method encompasses modifying via the UE segregation server unit [302], a bit status for one or more RAN features of the one or more UE having matched UE capability with the erroneous TAC and thereby causing KPI degradation in network.

Next, at step [618] the method encompasses sending via the UE segregation server unit [302], the modified UE capabilities to the MME [102].

Next, at step [620] the method encompasses updating the modified capability via the MME [102] to the eNB.

Also at step [622] no modifications in the UE capability is done via the UE segregation server unit [302]. Further, at step [622] the method encompasses sending the UE capabilities as it is (i.e. without any change) via the UE segregation server unit [302] to the MME [102].

The method after reducing the misuse of one or more radio resources by the one or more UEs by disabling one or more RAN feature of said one or more UE, terminates at step [624].

Figure 7:
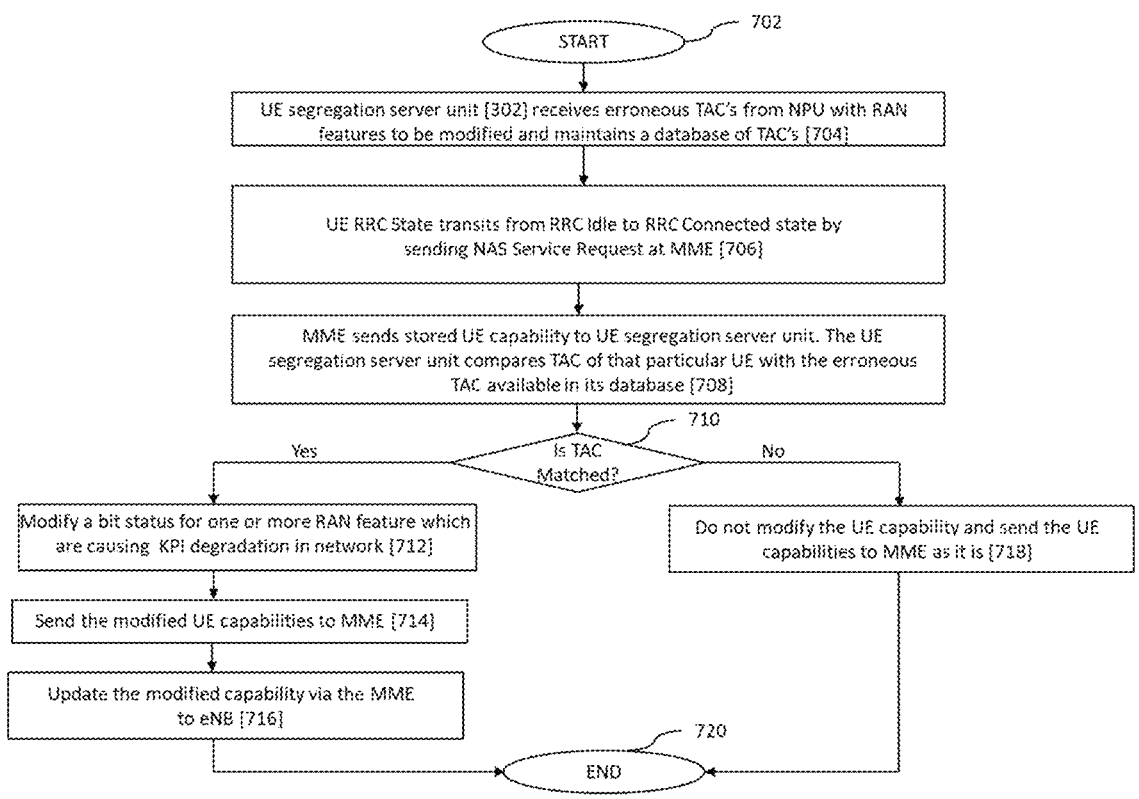
FIG. 7 illustrates an exemplary flow diagram, depicting an instance implementation of the process of modifying radio access network (RAN) features of one or more user equipment (UE), in accordance with exemplary embodiments of the present invention.

Referring to FIG. 7, an exemplary flow diagram, depicting an instance implementation of the process of modifying radio access network (RAN) features of one or more user equipment (UE), in accordance with exemplary embodiments of the present invention is shown. Furthermore, the FIG. 7 indicates the process of modifying the radio access network (RAN) features of the one or more user equipment (UE) in an event a UE RRC state transit from RRC-Idle to RRC-Connected.

As shown in FIG. 7, the process starts at step [702]. Thereafter, at step [704] the method encompasses receiving erroneous TAC's information from an NPU [304] with RAN features to be modified due to which one or more network KPI's are getting degraded. The erroneous TAC's information may further comprise at least one TAC information of the one or more erroneous user equipment. Also, at step [704] the method encompasses maintaining, at the UE segregation server unit [302], at least one database comprising the at least one TAC information of the one or more erroneous user equipment.

Next, at step [706] an instance of UE RRC State transit from RRC Idle to RRC Connected state by sending NAS Service Request (NAS SERVICE REQ) at MME [102] is shown. Further in such instance, the UE is already attached to a network and the UE is in RRC Idle state. Further, the UE transits from RRC Idle state to RRC Connected state when there is MO-Signalling, MO-Data, MT-Access, etc. by sending NAS Service Request.

Next, at step [708] once the MME [102] receives NAS SERVICE REQ, the MME [102] sends one or more stored UE capability information to the UE segregation server unit [302]. Thereafter, the UE segregation server unit [302] compares TAC of that particular UE (i.e. the one or more UE associated with the received UE capability information) with the erroneous TAC available in the at least one database.

Further, at step [710], the method encompasses identifying whether the TAC of the one or more UE associated with the received UE capability information matches with the erroneous TAC available in the at least one database or not. Further, in an event of successful comparison, the method leads to step [712] and otherwise, the method leads to step [718].

Next, at step [712] the method encompasses modifying via the UE segregation server unit [302], a bit status for one or more RAN features of the one or more UE having matched UE capability information with the erroneous TAC and thereby causing KPI degradation in the network.

Next, at step [714] the method encompasses sending via the UE segregation server unit [302], the modified UE capability information to the MME [102].

Next, at step [716] the method encompasses updating the modified capability information via the MME [102] to the eNB.

Also at step [718] no modifications in the UE capability information is done via the UE segregation server unit [302]. Further, at step [718] the method encompasses sending the UE capability information as it is (i.e. without any change) via the UE segregation server unit [302] to the MME [102].

The method after reducing the misuse of one or more radio resources by the one or more UEs by disabling one or more RAN feature of said one or more UE, terminates at step [720].

Figure 8:
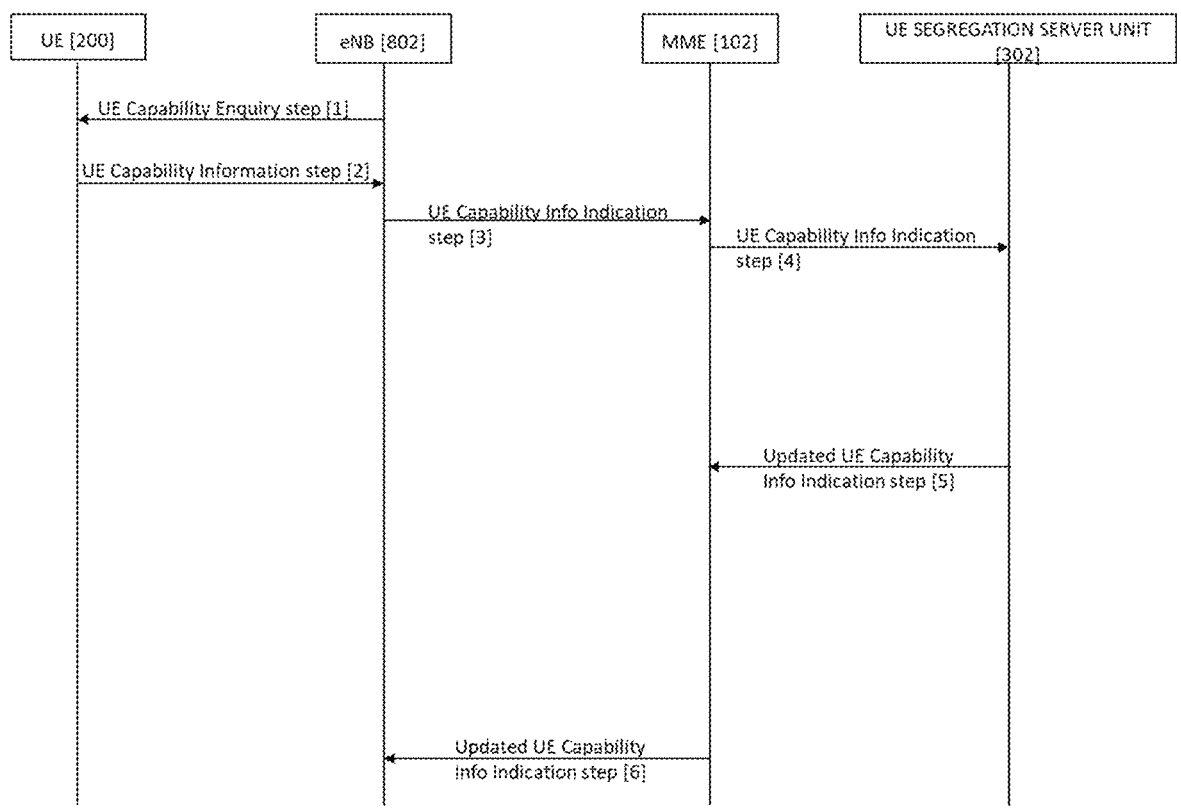
FIG. 8 illustrates an exemplary sequence diagram, depicting an instance implementation of the process of modifying radio access network (RAN) features of one or more user equipment (UE), in accordance with exemplary embodiments of the present invention.

Referring to FIG. 8, an exemplary sequence diagram, depicting an instance implementation of the process of modifying radio access network (RAN) features of one or more user equipment (UE), in accordance with exemplary embodiments of the present invention is shown.

At step [1], an eNodeB [802]/network sends a "UE Capability Enquiry" message to one or more UE [200]. The eNodeB specifies in the "UE Capability Enquiry" message, a RAT type to receive respective RAT information.

Next, at step [2], the one or more UE [200] responds to the eNodeB with "UE Capability information" message which specifies the hardware and software features of the one or more UE [200].

At step [3], the eNodeB [802] further transmits the "UE Capability information" message to the MME [102], as "UE capability Info Indication". The MME [102] thereafter stores the received one or more UE capabilities.

Next, at step [4], the MME [102] forwards the received "UE Info Capability Indication" message to an UE segregation server unit [302].

At step [5], the UE segregation server unit [302] compares the UE capability associated with the received UE Info Capability Indication of the one or more UEs [200], with an erroneous TAC (IMEI based) available at, at least database comprising erroneous TAC information, wherein the at least database maintained by the UE segregation server unit [302].

Also, at step [6], in an event of successful comparison/matching, the UE segregation server unit [302] updates the one or more UE capabilities of the successfully matched UE Info Capability Indication with the erroneous TAC information. Further, the UE segregation server unit [302] sends an updated UE info Capability Indication to MME [102]. Also, in an event of unsuccessful comparison the UE segregation server unit [302] sends the UE capabilities without any change to the MME [102].

Next, at step [7], the MME [102] forwards the received updated UE info Capability Indication to the eNodeB [802]. Further, the updated UE info Capability Indication message is transmitted to the eNodeB to disable certain radio capabilities which are causing some malfunction in the network.

Thus, the present invention provides a novel solution for the technical problem of maintaining one or more user devices/equipment on one or more networks without blocking/barring said one or more user devices completely. Furthermore, the present invention modifies one or more UE capability information of the one or more user devices in order to reduce the misuse of radio resources by the one or more user devices identified as erroneous user devices. The present invention also encompasses modifying the one or more UE capability information by updating/modifying at least one bit status of the one or more RAN features degrading one or more network KPIs. Further, the present invention sends the modified UE capability information to eNodeB of the one or more networks, in order to disable said one or more RAN features.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for modifying radio access network (RAN) features of one or more user equipment (UE), the method comprising:

based on at least one Type Allocation Code (TAC) information of a set of user equipment received at a UE segregation server unit from a network performance unit (NPU) and a UE capability information of one or more UE received at the UE segregation server unit from a Mobility Management Entity (MME), comparing, via the UE segregation server unit, at least one Type Allocation Code (TAC) information present in the received UE capability information with the at least one TAC information of the set of user equipment;

identifying, via the UE segregation server unit, one or more erroneous UE from the one or more UE based on a successful comparison of the at least one TAC information present in the received UE capability information of the one or more UE with the at least one TAC information of the set of user equipment; and modifying, via the UE segregation server unit, the UE capability information of the one or more identified erroneous UE, wherein the modifying, via the UE segregation server unit, the UE capability information further comprises:

analyzing, the UE capability information to identify one or more RAN features degrading one or more Key Performance Indicators (KPIs) of the one or more identified erroneous UE; and modifying, at least one bit status of the identified one or more RAN features;

wherein the method further comprises transmitting, from the UE segregation server unit to the MME, the modified UE capability information to disable the one or more RAN features of the one or more identified erroneous UE.

2. The method as claimed in claim 1, wherein the method further comprises maintaining, at the UE segregation server unit, at least one database comprising the at least one TAC information of the set of user equipment.

3. The method as claimed in claim 1, wherein the at least one TAC information of the set of user equipment is identified via the NPU, based on an analysis of one or more key performance indicators (KPIs) over a period of time.

4. The method as claimed in claim 3, wherein the at least one TAC information of the set of user equipment further comprises one or more international mobile equipment identity (IMEI) TAC details and the one or more RAN features of the set of user equipment that are required to be modified.

5. The method as claimed in claim 1, wherein the receiving, at the UE segregation server unit from a MME, a UE capability information further comprises receiving the UE capability information based on at least one event indicating, a receipt of the UE capability information at the MME from the one or more UE and a receipt of a NAS SERVICE REQ at the MME from the one or more UE.

6. The method as claimed in claim 5, wherein the receipt of the UE capability information at the MME from the one or more UE is based on an event indicating the one or more UE is powered on.

7. The method as claimed in claim 5, wherein the receipt of a NAS SERVICE REQ at the MME from the one or more UE is based on an event indicating that a UE Radio Resource Control (RRC) state of the one or more UE is transit from RRC-Idle to RRC-Connected.

8. A system for modifying radio access network (RAN) features of one or more user equipment (UE), the system comprising:

a UE segregation server unit configured to:
receive, from a network performance unit (NPU), at least one Type Allocation Code (TAC) information of a set of user equipment;
receive, from a Mobility Management Entity (MME), a UE capability information of one or more UE;

compare, at least one Type Allocation Code (TAC) information present in the received UE capability information with the at least one TAC information of the set of user equipment;

identify, one or more erroneous UE from the one or more UE based on a successful comparison of the at least one TAC information present in the received UE capability information of the one or more UE with the at least one TAC information of the set of user equipment; and modify, the UE capability information of the one or more identified erroneous UE;

wherein the UE segregation server unit, in order to modify the UE capability information is further configured to:
analyze, the UE capability information to identify one or more RAN features degrading one or more Key Performance Indicators (KPIs) of the one or more identified erroneous UE; and modify, at least one bit status of the identified one or more RAN features;

wherein the UE segregation server unit is further configured to transmit, to the MME, the modified UE capability information to disable the one or more RAN features of the one or more identified erroneous UE.

9. The system as claimed in claim 8, wherein the UE segregation server unit is further configured to maintain, at least one database comprising the at least one TAC information of the set of user equipment.

10. The system as claimed in claim 8, wherein the system further comprises the network performance unit (NPU), configured to identify the at least one TAC information of the set of user equipment, based on an analysis of one or more key performance indicators (KPIs) over a period of time.

11. The system as claimed in claim 10, wherein the at least one TAC information of the set of user equipment further comprises one or more international mobile equipment identity (IMEI) TAC details and the one or more RAN features of the set of user equipment that are required to be modified.

12. The system as claimed in claim 8, wherein the UE segregation server unit is further configured to receive from the MME, the UE capability information, based on at least one event indicating, a receipt of the UE capability information at the MME from the one or more UE and a receipt of a NAS SERVICE REQ at the MME from the one or more UE.

13. The system as claimed in claim 12, wherein the receipt of the UE capability information at the MME from the one or more UE is based on an event indicating the one or more UE is powered on.

14. The system as claimed in claim 12, wherein the receipt of a NAS SERVICE REQ at the MME from the one or more UE is based on an event indicating that a UE Radio Resource Control (RRC) state of the one or more UE is transit from RRC-Idle to RRC-Connected.

15. One or more non-transitory computer-readable media comprising computer-executable instructions that, when executed, cause a computing system to perform a method of modifying radio access network (RAN) features of one or more user equipment (UE), the method comprising:

receiving, at a UE segregation server unit from a network performance unit (NPU), at least one Type Allocation Code (TAC) information of a set of user equipment;

receiving, at the UE segregation server unit from a Mobility Management Entity (MME), a UE capability information of one or more UE;

comparing, via the UE segregation server unit, at least one Type Allocation Code (TAC) information present in the received UE capability information with the at least one TAC information of the set of user equipment;

identifying, via the UE segregation server unit, one or more erroneous UE from the one or more UE based on a successful comparison of the at least one TAC information present in the received UE capability information of the one or more UE with the at least one TAC information of the set of user equipment; and modifying, via the UE segregation server unit, the UE capability information of the one or more identified erroneous UE, wherein the modifying, via the UE segregation server unit, the UE capability information further comprises:

analyzing, the UE capability information to identify one or more RAN features degrading one or more Key Performance Indicators (KPIs) of the one or more identified erroneous UE; and modifying, at least one bit status of the identified one or more RAN features;

wherein the method further comprises transmitting, from the UE segregation server unit to the MME, the modified UE capability information to disable the one or more RAN features of the one or more identified erroneous UE.

* * * * *